United States Patent
Zhamu et al.

(10) Patent No.: US 11,767,412 B2
(45) Date of Patent: Sep. 26, 2023

(54) MANUFACTURING PROCESS FOR DARK-COLOR POLYMER COMPOSITE FILMS

(71) Applicant: Global Graphene Group, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 17/525,396

(22) Filed: Nov. 12, 2021

(65) Prior Publication Data
US 2022/0064406 A1    Mar. 3, 2022

Related U.S. Application Data

(62) Division of application No. 16/025,343, filed on Jul. 2, 2018, now Pat. No. 11,186,704.

(51) Int. Cl.
| | | |
|---|---|---|
| *C08K 5/3417* | (2006.01) | |
| *C08K 11/00* | (2006.01) | |
| *C08J 5/18* | (2006.01) | |
| *C09B 47/04* | (2006.01) | |

(52) U.S. Cl.
CPC ............ *C08K 5/3417* (2013.01); *C08J 5/18* (2013.01); *C08K 11/00* (2013.01); *C09B 47/04* (2013.01); *C08J 2379/06* (2013.01); *C08J 2379/08* (2013.01)

(58) Field of Classification Search
CPC .... C08K 5/3417; C08K 11/00; C08J 2379/08; C08J 2379/06; C08J 5/18; C09B 47/04
See application file for complete search history.

(56) References Cited

U.S. PATENT DOCUMENTS

| | | |
|---|---|---|
| 2,798,878 A | 7/1957 | Hummers |
| 3,179,634 A | 4/1965 | Murray |
| 4,022,649 A | 5/1977 | Nakagome et al. |
| 4,040,083 A | 8/1977 | Saiki et al. |
| 4,048,005 A | 9/1977 | Nakagome et al. |
| 4,048,139 A | 9/1977 | Calundann et al. |
| 6,265,472 B1 | 7/2001 | Fujii et al. |
| 7,824,651 B2 | 11/2010 | Zhamu et al. |
| 8,574,720 B2 | 11/2013 | Carney et al. |
| 2010/0308284 A1 | 12/2010 | Kinoshita et al. |
| 2012/0308741 A1 | 12/2012 | Kim et al. |
| 2014/0228513 A1 | 8/2014 | Jeol et al. |
| 2015/0166832 A1* | 6/2015 | Carney ............... B32B 27/28 427/407.1 |
| 2015/0166833 A1 | 6/2015 | Carney et al. |
| 2015/0266739 A1 | 9/2015 | Zhamu et al. |

FOREIGN PATENT DOCUMENTS

WO    2012042264 A3    8/2012

OTHER PUBLICATIONS

Duereh et al., "Replacement of hazardous chemicals used in engineering plastics with safe and renewable hydrogen-bond donor and acceptor solvent-pair mixtures" ACS Sustainable Chemistry & Engineering (2015) vol. 3.8, pp. 1881-1889.
Duereh et al., Supporting Information—Solvents—"Replacement of hazardous chemicals used in engineering plastics with safe and renewable hydrogen-bond donor and acceptor solvent-pair mixtures" ACS Sustainable Chemistry & Engineering (2015) vol. 3.8, pp. 1881-1889.
Duereh et al., Supporting Information—Solvents Supplement—"Replacement of hazardous chemicals used in engineering plastics with safe and renewable hydrogen-bond donor and acceptor solvent-pair mixtures" ACS Sustainable Chemistry & Engineering (2015) vol. 3.8, pp. 1881-1889.
PCT/US19/39699 International Search Report and Written Opinion dated Oct. 22, 2019, 13 pages.
Stevenson, Humus Chemistry: Genesis, Composition, Reactions (1982) pp. 258-263, John Wiley & Sons, New York.
U.S. Appl. No. 16/025,340 Final Office Action dated Sep. 23, 2020, 11 pages.
U.S. Appl. No. 16/025,340 Nonfinal Office Action dated Apr. 3, 2020, 6 pages.
U.S. Appl. No. 16/025,343 Final Office Action dated Sep. 11, 2020, 7 pages.
U.S. Appl. No. 16/025,343 Nonfinal Office Action dated Mar. 23, 2021, 8 pages.
U.S. Appl. No. 16/025,343 Nonfinal Office Action dated Mar. 30, 2020, 5 pages.

* cited by examiner

*Primary Examiner* — Robert D Harlan

(57) ABSTRACT

Provided is a process for producing a polymer composite film, comprising the steps of: (a) mixing a phthalocyanine compound with a polymer or its precursor and a liquid to form a slurry and forming the slurry into a wet film on a solid substrate, wherein the polymer is preferably selected from the group consisting of polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, and combinations thereof; and (b) removing the liquid from the wet film and, in some embodiments, converting the precursor to the polymer to form the polymer composite film comprising from 0.1% to 50% by weight of the phthalocyanine compound dispersed in the polymer.

12 Claims, 3 Drawing Sheets

MANUFACTURING PROCESS FOR DARK-COLOR POLYMER COMPOSITE FILMS

CROSS REFERENCE TO RELATED APPLICATIONS

The present application is a divisional of U.S. patent application Ser. No. 16/025,343, filed Jul. 2, 2018, the contents of which are hereby incorporated by reference for all purposes.

FIELD

The present invention relates generally to the field of dark-color polymer films that can be used as an optically opaque, non-reflecting substrate layer or coverlay in a micro-electronic device.

BACKGROUND

Electronic devices sometimes require opaque, dark-color covering films. Carbon black filled polyimide is one example of opaque covering or coverlay films. Toughness, high dielectric strength, opaqueness, and matte surface finish are desirable features of these films. High thermal conductivity (as compared to an unfilled polymer film) is also desirable.

More specifically, the carbon black-filled polymer composite film is an opaque film that can be used as a substrate or a coverlay. For a flexible circuit board application, the polymer composite film may be a pre-coated on one side with an epoxy adhesive, ready to be bonded. Alternatively, the matte black polyimide film may be coated with an acrylic resin. The matte black color of these materials provides an aesthetically pleasing appearance to flexible printed circuit materials while also maintaining dielectric strength, tensile strength and dimensional stability, which are some of the key physical properties.

The use of these materials to achieve an opaque coverlay is beneficial in several ways. The black finish of the films may help prevent reverse engineering of the circuits it covers, since the coverlay can make it difficult to identify the exact configuration of the underlying circuit traces. Additionally, the opacity of black polymer films can provide higher yields and cost savings in certain applications. In optical applications, such as headlamps and camera flashes, these matte polymer films can help prevent reflections.

However, several major drawbacks are found to be associated with state-of-the-art black polyimide films. For instance, the use of carbon black particles as a pigment makes it difficult to produce smooth, pinhole-free films. Additionally, carbon black particles, typically having an aggregate size from 2 to 15 microns (μm), makes it challenging to produce films thinner than 15 μm and practically impossible to produce matte black films thinner than 8 μm and having a sufficiently large area (e.g. length and width >10 cm) and consistent quality. Conventional pigments also tend to result in a low dielectric strength.

It is an object of the present invention to provide opaque, dark-color polymer films that are available in a wider thickness range (e.g. from 10 nm to 500 μm), high dielectric strength, high tensile strength, and surface smoothness. Another object of this invention is to provide a process for cost-effectively producing such thin films.

SUMMARY

The present invention provides a black-color polymer composite film comprising a phthalocyanine compound dispersed in a polymer, wherein the phthalocyanine compound occupies a weight fraction of 0.1% to 50% based on the total polymer composite weight. The polymer composite film has a typical thickness from 10 nm to 500 μm, more typically from 100 nm to 200 μm, still more typically from 1 μm to 100 μm.

In some embodiments, the polymer is selected from the group consisting of polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, and combinations thereof. The polymer is not limited to this group of materials. The polymer can be a thermoplastic, thermoset, or rubber matrix material.

In some embodiments, the phthalocyanine compound is selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, or a combination thereof.

In some embodiments, the black-color polymer composite film further comprises from 0.1% to 30% of a pigment selected from graphene, humic acid, expanded graphite flakes, fine carbon black particles having a medium size from 150 nm to 2 μm, or a combination thereof.

In certain embodiments, the black-color polymer composite film further comprises from 0.1% to 15% by weight of a matting agent dispersed in the polymer based on the total polymer composite weight.

The graphene, as a pigment material, may contain single-layer or few-layer graphene sheets selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof, wherein the few-layer graphene is defined as a graphene sheet or platelet formed of 2-10 graphene planes.

Preferably, the graphene material used in the composite film contains single-layer or few-layer graphene sheets selected from graphene oxide, reduced graphene oxide, graphene fluoride, graphene chloride, graphene bromide, graphene iodide, hydrogenated graphene, nitrogenated graphene, chemically functionalized graphene, or a combination thereof, wherein the graphene material contains greater than 10% by weight (preferably >20% by weight) of a non-carbon element (e.g. O, N, H, F, Cl, Br, I, S, B, P, etc.).

In some embodiments, the humic acid, as a pigment in the black-color polymer composite film, comprises chemically functionalized humic acid molecules (CHA) that contain a chemical functional group selected from a polymer, $SO_3H$, COOH, $NH_2$, OH, R'CHOH, CHO, CN, COCl, halide, COSH, SH, COOR', SW, $SiR'_3$, $Si(-OR'-)_yR'_{3-y}$, $Si(-O-SiR'_2-)OR'$, R'', Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and Z is carboxylate or trifluoroacetate, or a combination thereof.

The black-color polymer composite is optically opaque and non-reflecting if containing a matte agent. Such a polymer composite film can be used as a substrate layer or covering layer ("coverlay") in a wide variety of microelectronic devices. However, for certain other applications (e.g. as part of a casing for a hand-held device), a smooth, shiny surface may be more appealing. The polymer composite film, if containing substantially oriented phthalocyanine compound molecules, has a surprisingly pleasing appearance.

In certain desired embodiments, the polymer in the black-color polymer composite film comprises a chemically or thermally, converted polyimide which is derived from at least 50 mole percent of an aromatic dianhydride, based upon a total dianhydride content of the polyimide, and at least 50 mole percent of an aromatic diamine based upon a total diamine content of the polyimide.

In such a polyimide film, the aromatic dianhydride may be selected from the group consisting of: pyromellitic dianhydride, 3,3'4,4'-biphenyl tetracarboxylic dianhydride, 3,3',4,4'-benzophenone tetracarboxylic dianhydride; 4,4'-oxydiphthalic anhydride, 3,3',4,4'-diphenyl sulfone tetracarboxylic dianhydride, 2,2-bis(3,4-dicarboxyphenyl)hexafluoropropane, bisphenol A dianhydride, and mixtures thereof. Additionally, the aromatic diamine may be selected from the group consisting of: 3,4'-oxydianiline, 1,3-bis-(4-aminophenoxy)benzene, 1,4-diaminobenzene, 1,3-diaminobenzene, 2,2'-bis(trifluoromethyl)benzidene, 4,4'-diaminobiphenyl, 4,4'-diaminodiphenyl sulfide, 9,9'-bis(4-amino)fluorine and mixtures thereof.

In certain embodiments, the black-color polymer composite film has matte surfaces and a 60-degree gloss value of from 2 to 35.

In certain embodiments, the black-color polymer composite film has a thickness from 1.0 to 40 microns. For certain applications, the film has a thickness from 10 to 40 microns; a 60-degree gloss from 10 to 35; and an optical density greater than or equal to 2.

The black-color polymer composite film may be bidirectionally stretched or unidirectionally stretched.

In certain embodiments, the polyimide-based black-color polymer composite film has surfaces with a 60-degree gloss from 2 to 35 and uniform color intensity, a thickness from 1.0 to 40 μm, an optical density greater than or equal to 2, and contains an inorganic silica matting agent in an amount of 0.5 to 20% by weight.

The invention also provides a multilayer film comprising the aforementioned polymer composite film and an adhesive layer. The adhesive layer preferably contains an epoxy resin selected from the group consisting of: bisphenol A epoxy resin, cresol novolac epoxy resin, phosphorus containing epoxy resin, and mixtures thereof. In some embodiments, the multilayer film is a coverlay film.

The invention also provides an electronic device containing the polymer composite film or the multilayer film.

The invention also provides a process for producing the black-color polymer composite film, the process comprising the steps of: (a) mixing a phthalocyanine compound with a polymer or its precursor (monomer, oligomer, intermediate, such as polyamic acid to polyimide) in a liquid to form a slurry or solution and forming the slurry or solution into a wet film under the influence of an orientation-inducing stress field to align molecules of the phthalocyanine compound on a solid substrate, wherein the polymer is selected from the group consisting of polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, and combinations thereof; and (b) removing the liquid from the wet film to form the polymer composite film. In some embodiments, step (b) comprises polymerizing or curing the monomer or oligomer or converting the intermediate to form the polymer (e.g. converting polyamic acid to polyimide).

The step of forming a wet film is preferably conducted by spraying, printing, painting, casting or coating. The process preferably contains a roll-to-roll procedure.

It is an object of the present disclosure to provide a process for producing opaque polymer films, and especially opaque polyimide films having a high dielectric breakdown strength, and suitable toughness (good tensile strength and ductility combined) for use in electronic packaging, including handheld electronic devices.

Herein presented is a process for producing a phthalocyanine compound-filled polymer film comprising the steps of: (a) mixing a phthalocyanine compound with a polymer precursor, a liquid (e.g. water or an organic solvent), and an optional curing agent to obtain a slurry (b) forming the slurry into a phthalocyanine compound-filled precursor polymer composite film and (c) initiating a cure reaction of the a phthalocyanine compound-filled precursor polymer composite film. The curing reaction may be initiated chemically, by heat, by exposure to radiation, or by light.

The film-forming process may optionally be carried out under the influence of an orientation-inducing stress field, for example by using a slot-die head, comma coater head, or a pair of reverse-rotating rollers. For instance, the step of forming the slurry into a wet film may be carried out by a doctor blade-assisted casting, slot die coating, comma coating, reverse-rollers coating, spray coating, spin coating, or screen printing in such a manner that the step is conducted under the influence of an orientation-inducing stress field to align the molecules of the phthalocyanine compound on a solid substrate. The resulting composite film has the phthalocyanine compound molecules being substantially parallel to each other, leading to higher mechanical strength, dielectric strength, and surface smoothness.

The step of partially or completely removing the liquid from the wet film may be carried out in vacuum, in an inert atmosphere, in a ventilation environment, or at a temperature from 25° C. to 300° C.

The converting step (e.g. imidizing step) is preferably carried out by exposure to a temperature from 100° C. to 500° C. for a period of time sufficient to convert polyamic acid to polyimide and/or to effect crosslinking of the polymer and chemical bonding of the polymer to the phthalocyanine compound, by exposure to light, by exposure to microwave energy, by exposure to radiation, or by combinations thereof. The period of time is preferably from 1 minute to 4 hours.

The process may further comprise a step of compressing or stretching the phthalocyanine compound-filled polyimide film during or after said step (d) of imidizing the phthalocyanine compound-filled polyimide film.

The process may further comprise a step of adding one or more additional layers of phthalocyanine compound-filled polymer film after completing a first layer of phthalocyanine compound-filled composite film, where the one or more additional layers have the same chemical composition as the first layer or have a different chemical composition.

The process may further comprise a step of adding one or more additional layers of precursor composite film after completing a first layer of precursor composite film, where the one or more additional layers have the same chemical composition as said first layer, or have a different chemical composition.

The process is preferably carried out as a continuous or roll-to-roll process.

In certain embodiments, the polyimide precursor material may be selected from aromatic diamines, aliphatic diamines, and mixtures thereof in combination with aromatic dianhydrides.

The process slurry may further comprise a monomer, an oligomer, a polymer, a photosensitizer, or a combination thereof. The slurry or suspension may further comprises a cure agent or anhydride selected from benzenetrtracarboxylic dianhydride, biphenyltetracarboxylic dianhydride, diethylenetriaminepentaacetic dianhydride (DTPA), ethylenediaminetetraacetic dianhydride (EDTA), mellitic acid dianhydride (MADA), naphthalenetetracarboxylic dianhydride, oxydibenzoic dianhydride, oxydiphthalic anhydride (ODPA), phthalic anhydride, pyromellitic dianhydride (PMDA) and combinations thereof.

The liquid may comprise water, acetone, γ-butyrolactone, chlorobenzene, cyclopentyl methyl ether, dihydrolevoglucosenone, dimethylacetamide (DMAc), ethanol, N-methyl-2-pyrrolidone (NMP), hexafluoroisopropanol (HFIP), butylated hydroxytoluene (BHT), dimethylformamide (DMF), dimethylsulfoxide (DMSO), methanol, methyl acetate, methyl ethyl ketone, methylene chloride, piperazine, sodium trifluoroacetate (NaTFA), tert-butanol, tetrahydrofuran (THF), 1,2,4-trichlorobenzene (TCB), triethylamine (TEA), triethyl phosphate, toluene, derivatives thereof, and mixtures thereof.

The slurry or suspension may further comprise a matting agent, a colorant, a reinforcement material or other additive at total non-graphene oxide additive weight of 0.1 weight percent to 15 weight percent of the total weight of the dried film.

The invention also provides a phthalocyanine compound-polyimide film made by the invented process described in the foregoing, having a thickness preferably from 1 μm to 200 μm (can be as thin as 10 nm or as thick as several mm.

The phthalocyanine compound-filled polyimide film may have a modulus from 1000 to 6000 MPa. More typically from 2,000 to 5,000 MPa. The phthalocyanine compound-filled polyimide film may have a dielectric strength greater than 1,500 V/mil, more typically greater than 3,000, and further more typically greater than 5000 V/mil. The phthalocyanine compound-filled polyimide film may have a dielectric strength from 3000 V/mil to 7000 V/mil. The phthalocyanine compound-filled polyimide film may have multiple layers of varying compositions.

The invention also provides a process for producing a phthalocyanine compound-filled polymer film comprising the steps of: (a) mixing phthalocyanine compound (along with other optional ingredients, such as graphene sheets, expanded graphite platelets, and humic acid molecules) with a polymer precursor material and a liquid to form a slurry or suspension, wherein the graphene sheets are selected from graphene oxide, reduced graphene oxide, chemically reduced graphene oxide, fluorinated graphene, hydrogenated graphene, nitrogenated graphene, doped graphene, chemically functionalized graphene, and combinations thereof; (b) forming the slurry or suspension into a wet film; (c) partially or completely removing the liquid from the wet film to form a precursor polymer composite film; and (d) initiating a cure reaction of the film to obtain a phthalocyanine compound-filled composite film.

The polymer is preferably selected from the group consisting of polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, and combinations thereof.

The invention also provides a phthalocyanine compound-reinforced polymer film. In the composite film, the phthalocyanine compound molecules are substantially parallel to each other and, hence, exhibit a high elastic modulus, high tensile strength, and high dielectric strength.

The invention also provides an electronic device (e.g. smart phone, smart watch, tablet computer, etc.) containing the black-color polymer composite film.

The inventive process is typically conducted in such a manner that the resulting phthalocyanine compound-filled carbon precursor polymer composite film exhibits an optical birefringence less than 1.4. In one aspect, the optical birefringence is less than 1.2.

DETAILED DESCRIPTION

The term "substantially" and its variations are defined as being largely, but not necessarily wholly, what is specified as understood by one of ordinary skill in the art, and in one non-limiting embodiment "substantially" refers to ranges within 10%, within 5%, within 1%, or within 0.5% of a referenced range. The term "black" is defined as being largely, but not necessarily wholly, what is specified as understood by one of ordinary skill in the art, and in one non-limiting embodiment "black" refers to CIELAB color measurements having coordinates in the range from $l^*=0$ to 30, $a^*=-15$ to $+15$, and $b^*=-15$ to $+15$. Preferably, $a^*$ and $b^*$ color coordinates are substantially 0.

The present invention provides a black-color polymer composite film comprising a phthalocyanine compound dispersed in a polymer, wherein the phthalocyanine compound occupies a weight fraction from 1% to 50% based on the total polymer composite weight.

In some embodiments, the polymer is selected from the group consisting of polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, and combinations thereof.

The phthalocyanine compound may be selected from a metal phthalocyanine compound (such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, or silver phthalocyanine), or a metal-free phthalocyanine (e.g. hydrogen phthalocyanine), or a combination thereof.

Figure 1A:
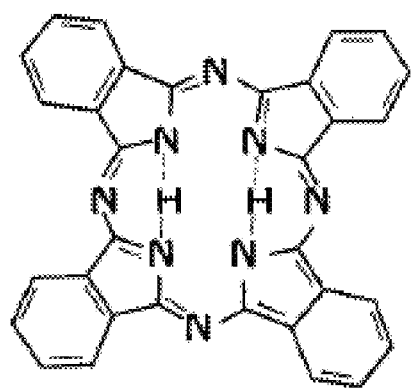
FIG. 1(A) Chemical formula of H2Pc (as an example of metal-free phthalocyanine compounds)
Figure 1B:
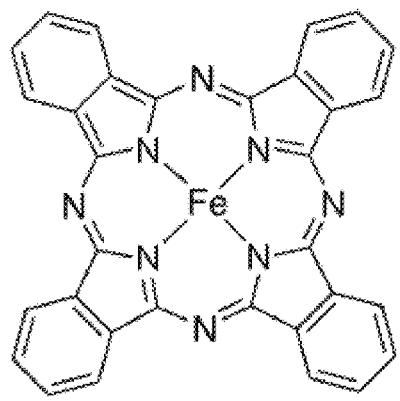
FIG. 1(B) Chemical formula of FePc (as an example of metal phthalocyanine compounds).

Illustrated in FIG. 1(A) is the chemical formula of H2Pc (as an example of metal-free phthalocyanine compounds). FIG. 1(B) shows the chemical formula of FePc (as an example of metal phthalocyanine compounds). This group of material has a distinct characteristic that it is a planar, aromatic molecule that has low electrical and thermal conductivities. The thinness of these molecules (typically from 0.4 nm to 1.5 nm) makes it possible to produce polymer composite films as thin as 10 nm. We have routinely produced polymer composite films from 10 nm to 500 μm, more typically from 100 nm to 200 μm, and still more typically from 1 μm to 100 μm (desirably from 1 to 8 μm for certain applications).

For use in the presently invented polymer composite film, transition metal phthalocyanine compounds, such as iron phthalocyanine (FePc), nickel phthalocyanine (NiPc), manganous phthalocyanine (MnPc), and cobalt phthalocyanine, are particularly desirable due to their ability to impart high dielectric constants or high dielectric strength to polymers. They are also found to be chemically compatible with the graphene materials.

Phthalocyanine compounds may be dissolved or dispersed in a wide variety of solvents, including water, polar organic solvents (DMF, DMSO, DMAc, THF, acetone, acetonitrile, chloroform, etc.), and some acids (e.g. acetic acid, formic acid, sulfuric acid, phosphoric acid, trifluoroacetic acid, etc.) that are commonly used to dissolve or disperse the precursor (e.g. monomer) to a polymer or the polymer itself. Thus, the phthalocyanine compound can be readily dispersed in a polymer matrix by dissolving the phthalocyanine compound and the polymer (or its precursor) in a solvent to form a solution, forming the solution into a film shape, removing the solvent to form a polymer composite film or a precursor composite film, and, if necessary or appropriate, converting the precursor into the polymer (e.g. converting polyamic acid to polyimide) to obtain the final polymer composite film.

In some embodiments, the black-color polymer composite film further comprises from 0.5% to 30% of a pigment selected from graphene, humic acid, expanded graphite flakes, fine carbon black particles having a medium size from 150 nm to 2 μm, or a combination thereof. Expanded graphite flakes and carbon black are more well-known in the art.

The graphene materials may be selected from a single-layer sheet or multi-layer platelet of graphene, graphene oxide, graphene fluoride, hydrogenated graphene, nitrogenated graphene, pristine graphene, doped graphene, boron doped graphene, nitrogen doped graphene, chemically treated graphene, reduced graphene oxide, functionalized graphene or graphene oxide, or a combination thereof. In the present application, nano graphene platelets (NGPs) or "graphene materials" collectively refer to single-layer and multi-layer versions of graphene, graphene oxide, graphene fluoride, hydrogenated graphene, nitrogenated graphene, doped graphene, etc.

The thickness of an NGP is no greater than 100 nm and, in the present application, no greater than 10 nm (preferably no greater than 5 nm). The NGP may be single-layer graphene. In the presently defined NGPs, there is no limitation on the length and width, but they are preferably smaller than 10 μm and more preferably smaller than 1 μm. We have been able to produce NGPs with length smaller than 100 nm or larger than 10 μm. The NGP can be pristine graphene (with essentially 0% oxygen content) or graphene oxide (typically from 10 up to approximately 53% by weight oxygen). Graphene oxide can be thermally or chemically reduced to become reduced graphene oxide (typically with an oxygen content of 1-10%, mostly below 5% by weight). For use in the polymer composite film, the oxygen content or non-carbon content is preferably in the range from 5% to 45% by weight, and more preferably in the range from 10% to 35% by weight.

Graphene materials may be produced by using the following recommended procedures:

(a) dispersing or immersing a laminar graphite material (e.g., natural graphite powder) in a mixture of an intercalant and an oxidant (e.g., concentrated sulfuric acid and nitric acid, respectively) to obtain a graphite intercalation compound (GIC) or graphite oxide (GO);

(b) exposing the resulting GIC or GO to a thermal shock, preferably in a temperature range of 600-1,100° C. for a short period of time (typically 15 to 60 seconds), to obtain exfoliated graphite or graphite worms (some oxidized NGPs with a thickness <100 nm could be formed at this stage if the intercalation/oxidation step was allowed to proceed for a sufficiently long duration of time; e.g. >24 hours);

(c) dispersing the exfoliated graphite to a liquid medium and using ultrasonication to obtain a graphene-liquid suspension;

(d) aerosolizing the graphene-liquid suspension into liquid droplets while concurrently removing the liquid to recover curved NGPs.

It may be noted that steps (a) to (b) are the most commonly used steps to obtain exfoliated graphite and graphene oxide platelets in the field. Step (d) is essential to the production of curved graphene sheets. Oxidized NGPs or GO platelets may be chemically reduced to recover conductivity properties using hydrazine as a reducing agent, before, during, or after chemical functionalization.

In 2007, we reported a direct ultrasonication method of producing pristine nano graphene directly from graphite particles dispersed in a surfactant-water suspension [A. Zhamu, et al, "Method of Producing Exfoliated Graphite, Flexible Graphite, and Nano-Scaled Graphene Plates," U.S. patent application Ser. No. 11/800,728 (May 8, 2007) (now U.S. Pat. No. 7,824,651)]. This method entails dispersing natural graphite particles in a low surface tension liquid, such as acetone or hexane. The resulting suspension is then subjected to direct ultrasonication for 10-120 minutes, which produces graphene at a rate equivalent to 20,000 attempts to peel off graphene sheets per second per particle. The graphite has never been intercalated or oxidized and, hence, requires no subsequent chemical reduction. This method is fast, environmentally benign, and can be readily scaled up, paving the way to the mass production of pristine nano graphene materials. The same method was later studied by others and now more commonly referred to as the "liquid phase production."

Nitrogenated graphene, nitrogen-doped graphene, or boron-doped graphene can be produced from chemical synthesis, chemical vapor deposition (CVD), or ion implantation. For instance, nitrogen-doped graphene can be produced from CVD using $CH_4$ as a carbon source, $NH_3$ as a nitrogen source, nano-scaled Cu/Ni particles (or Cu, Ni, or Cu/Ni, foil) as a catalyst. Boron-doped graphene can be produced by boron ion implantation.

The following includes definitions of various terms and phrases used throughout this specification.

The term "graphene" means a material comprising one or more planar sheets of bonded carbon atoms that are densely packed in a hexagonal crystal lattice in which carbon atoms are bonded together through strong in-plane covalent bonds, and further containing an intact ring structure throughout a majority of the interior. Preferably at least 80% of the interior aromatic bonds are intact. In the c-axis (thickness) direction, these graphene planes may be weakly bonded together through van der Waals forces. Graphene may contain non-carbon atoms at their edges or surface, for example OH and COOH functionalities. The term graphene includes pristine graphene, graphene oxide, reduced graphene oxide, halogenated graphene including graphene fluoride and graphene chloride, nitrogenated graphene, hydrogenated graphene, doped graphene, functionalized graphene, and combinations thereof. Typically, non-carbon elements comprise 0 to 25 weight % of graphene sheets. The term "doped graphene" encompasses graphene having less than 10% of a non-carbon element. This non-carbon element can include hydrogen, oxygen, nitrogen, magnesium, iron, sulfur, fluorine, bromine, iodine, boron, phosphorus, sodium, and combinations thereof. Graphene may comprise single-layer graphene or few-layer graphene, wherein the few-layer graphene is defined as a graphene platelet formed of less than 10 graphene planes. Graphene may also comprise graphene nanoribbons. "Pristine graphene" encompasses graphene sheets having essentially zero % of non-carbon elements. "Nanographene platelet" (NGP) refers to a graphene having a thickness from less than 0.34 nm (single layer) to 100 nm (multi-layer).

Graphene oxide refers to a graphene material comprising up to 53% oxygen by weight. Functional groups may be found primarily at the edges of graphene oxide platelets. Graphene oxide may comprise single-layer graphene oxide or few-layer graphene oxide, wherein the few-layer graphene is defined as a graphene platelet formed of less than 10 graphene planes. Graphene oxide platelets may have a lateral dimension of 100 nm, 500 nm, 1 µm, 2 µm or may be larger or smaller. Graphene oxide may be chemically reduced, for example by addition of ascorbic acid and exposure to a temperature of about 80° C., or may by thermally reduced by exposure to light, radiation, or a heat energy at a temperature from about 80° C. to 3300° C. Reference is made to U.S. Pat. No. 2,798,878A, issued Jul. 9, 1957, for a complete description of a method of preparing graphene oxide (the Hummers Process), applicable in the instant disclosure, which is hereby incorporated by reference for the purpose of teaching the production of graphene oxide.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5% of a referenced range.

Humic acid (HA) is an organic matter commonly found in soil and can be extracted from the soil using a base (e.g. KOH). HA can also be extracted from a type of coal called leonardite, which is a highly oxidized version of lignite coal. HA extracted from leonardite contains a number of oxygenated groups (e.g. carboxyl groups) located around the edges of the graphene-like molecular center ($SP^2$ core of hexagonal carbon structure). This material is slightly similar to graphene oxide (GO) which is produced by strong acid oxidation of natural graphite. HA has a typical oxygen content of 5% to 42% by weight (other major elements being carbon, hydrogen, and nitrogen). An example of the molecular structure for humic acid, having a variety of components including quinone, phenol, catechol and sugar moieties, is given in Scheme 1 below (source: Stevenson F. J. "*Humus Chemistry: Genesis, Composition, Reactions,*" John Wiley & Sons, New York 1982).

(Scheme 1)

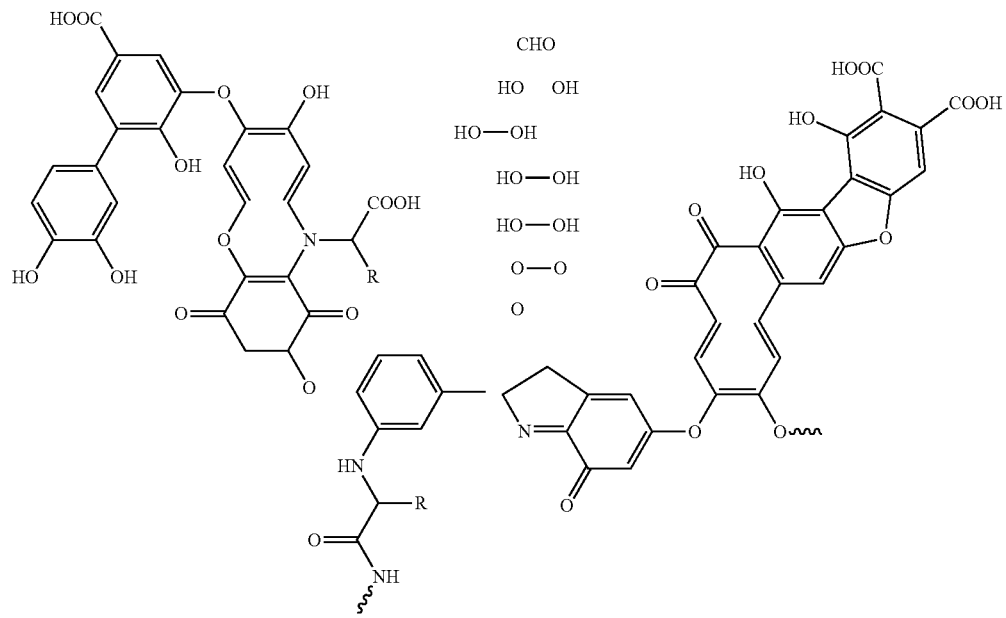

Non-aqueous solvents for humic acid include polyethylene glycol, ethylene glycol, propylene glycol, an alcohol, a sugar alcohol, a polyglycerol, a glycol ether, an amine-based solvent, an amide-based solvent, an alkylene carbonate, an organic acid, or an inorganic acid.

In addition to graphene, humic acid, expanded graphite, and carbon black, other pigments may be added to the polymer composite films, if so desired. In some embodiments, useful pigments include the following: barium lemon yellow, cadmium yellow lemon, cadmium yellow middle, cadmium yellow orange, scarlet lake, cadmium red, cadmium vermilion, alizarin crimson, permanent magenta, van dyke brown, raw umber greenish, or burnt umber. In certain embodiments, useful black pigments include: cobalt oxide, Fe—Mn—Bi black, Fe—Mn oxide spinel black, $(Fe,Mn)_2O_3$ black, copper chromite black spinel, lampblack, bone black, bone ash, bone char, hematite, black iron oxide, micaceous iron oxide, black complex inorganic color pigments (CRT), $CuCr_2O_4$ black, $(Ni,Mn,Co)(Cr,Fe)_2O_4$ black, aniline black, perylene black, anthraquinone black, chromium green-black hematite, chrome iron oxide, pigment green 17, pigment black 26, pigment black 27, pigment black 28, pigment brown 29, pigment black 30, pigment black 32, pigment black 33 or mixtures thereof. These are but some of the many useful pigments.

In certain embodiments, the black-color polymer composite film further comprises from 0.5% to 15% by weight of a matting agent dispersed in the polymer based on the total polymer composite weight.

Silica is an inorganic material available as solid particles that can be ground and filtered to desired particle size ranges. The irregular shape and porosity of silica particles and low cost make this material a good choice as a matting agent. Other potential matting agents can include: (a) other ceramics, such as, borides, nitrides, carbides and other oxides (e.g., titania, silicon nitride, etc.); and (b) organic particles, provided the organic particle can withstand the processing temperature of a chemically converted polyimide (processing temperatures of from about 250° C. to about 550° C., depending upon the particular polyimide process chosen) or synthesis temperatures of other polymers. One matting agent that can be useful in polyimide applications (can withstand the thermal conditions of polyimide synthesis) is polyimide particles.

If reduced reflection and glossiness is desired, the amount of matting agent, median particle size and density must be sufficient to produce the desired 60-degree gloss value. In some embodiments, the base film 60-degree gloss value is between and optionally including any two of the following: 2, 5, 10, 15, 20, 25, 30 and 35. In some embodiments, the base film 60-degree gloss value is from 10 to 35.

The invention also provides a process for producing an opaque phthalocyanine compound-filled polymer film having a high dielectric constant and/or a high dielectric strength. The polymer film may contain polyimide.

In some embodiments, the process for producing a phthalocyanine compound-filled polymer film (polymer composite film) comprises the steps of:
(a) mixing a phthalocyanine compound (optionally along with graphene sheets, humic acid molecules, expanded graphite platelets, and/or fine carbon black particles) with a polymer precursor, a liquid (e.g. water or other solvent), and an optional curing agent to obtain a slurry;
(b) forming the slurry into a wet film and partially or completely removing the liquid from the wet film to form a phthalocyanine compound-filled precursor polymer composite film; and
(c) initiating a cure or conversion reaction (e.g. imidization) of the phthalocyanine compound-filled precursor polymer composite film to form the phthalocyanine compound-filled polymer composite film.

The mixing step (step (a)) can be accomplished by dissolving a polymer, monomer, oligomer, polymer precursor material (e.g. polyimide precursor material) in a solvent to form a solution and then dispersing or dissolving the phthalocyanine compound in the solution to form a suspension, slurry, or solution. Typically, the polymer is in the amount of 0.1%-10% by weight in the polymer-solvent solution prior to mixing with the phthalocyanine compound. The phthalocyanine compound may occupy 1% to 30% (more typically 3% to 20% and most desirably 5%-10%) by weight of the slurry. A high shear mixer may be used for this process. Heat may be applied to the slurry during this process. Cooling may be applied. The phthalocyanine compound may be added to the slurry prior to adding the polymer, after adding the polymer, or simultaneously. The slurry may also be created by dissolving a phthalocyanine compound-polymer composite, or by dissolving a phthalocyanine compound-polymer precursor composite.

The polymer precursor material may be selected from the group consisting of a precursor (e.g. monomer or oligomer) to polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, precursors thereof, derivatives thereof, and combinations thereof. The polymer film precursor material may be 3,4'-oxydianiline. The polymer precursor material may be an aromatic diamines, aliphatic diamines, or mixture thereof in combination with an aromatic dianhydrides.

The polymer film precursor material may be a polyimide precursor material. Polyimide precursor materials may include aromatic diamines, aliphatic diamines, and mixtures thereof in combination with aromatic dianhydrides. Polyimide precursor materials may include a catalyst or a dehydrating agent. Polyimide precursor materials may include 3,4'-oxydianiline (ODA) combined with pyromellitic dianhydride (PMDA) in about a 1:1 molar ratio to create polyamic acid. Reference is made to U.S. Pat. No. 3,179,634 (issued Apr. 20, 1965); U.S. Patent Application No. 2012/0308741A1 (published Dec. 6, 2012); and U.S. Patent Application No. 2014/0228513, published Aug. 14, 2014, for description of some typical polyimide precursor materials, applicable in the instant disclosure.

Polyimide precursor materials may include 1,2,3,4-cyclopentanetetracarboxylic acid dianhydride (CPDA), 5-diaminobenzoic acid, 2,4-diaminobenzenesulfonic acid, 1,10-diaminodecane, 1,12-diaminododecane, 1,13-diaminotridecane, 1,14-diaminotetradecane, 1,2,5,6-naphthalenetetracarboxylic, 1,2-diaminoethane, 1,3-diaminopropane, 1,4-diaminobutane, 1,5-diaminopentane, 1,7-diaminoheptane, 1,8-diaminooctane, 1,9-diaminonane, 1,1-bis(2,3-dicarboxyphenyl)ethane dianhydride, 1,2,5,6-naphthalene tetracarboxylic dianhydride, 1,2-diaminobenzene, 1,3-bis-(4-aminophenoxy)benzene, 1,3-diaminobenzene, 1,3-diaminocyclohexane, 1,4-diaminocyclohexane, 1,4-bis(aminophenoxy)benzene (TPE-Q), 1,4-diaminobenzene (PPD), 1,5-diamino naphthalene, 2-(methacryloyloxy) ethyl 3,5-diaminobenzoate, 2,2',3,3'-benzophenone tetracarboxylic acid, 2,2',3,3'-biphenyltetracarboxylic acid, 2,2,4- and 2,4,4-trimethyl-hexamethylene diamine, 2,2',3,3'-biphenyl tetracarboxylic dianhydride, 2,2'-bis(trifluoromethyl) benzidene, 2,2'-bis-(3,4 bicarboxyphenyl) hexafluoropropane tetracarboxylic, 2,2-bis(3,4-dicarboxyphenyl) propane dianhydride, 2,2-bis(3,4-dicarboxyphenyl)hexafluoropropane, 2,2-bis(aminophenoxyphenyl)hexafluoropropane (HFBAPP), 2,2-bis(aminophenoxyphenyl)propane (BAPP), 2,2-bis(aminophenyl)hexafluoropropane (HFDA), 2,5-diaminobenzenesulfonic acid, 2,5-dimethyl-hexamethylenediamine, 2-methyl-1,5-diaminopentane, 3,3 ', 4,4'-benzophenonetetracarboxylic acid, 3,3 ', 4,4'-biphenyltetracarboxylic acid, 3,3',4,4'-biphenyl tetracarboxylic dianhydride, 3,3',4,4'-diphenyl sulfone tetracarboxylic dianhydride, 3,3'-diamino diphenyl sulfone, 3,3'-dichlorobenzidine, 3,4,9,10-perylenetetracarboxylic acid, 3,4,9,10-perylenetetracarboxylic dianhydride, 3,4'-oxydianiline, 3,5-diaminophenyl cinnamate, 3-methyl-hexamethylene diamine, 4-(2,5-dioxotetrahydrofuran-3-yl)-tetralin-1,2-dicarboxylic acid anhydride (DOTDA), 4,4'-diamino diphenyl diethylsilane, 4,4'-diamino diphenyl ethyl phosphine oxide, 4,4'-diamino diphenyl methane, 4,4'-diamino diphenyl N-methyl amine, 4,4'-diamino diphenyl N-phenyl amine, 4,4'-diamino diphenyl silane, 4,4'-diamino diphenyl sulfone, 4,4'-diaminobiphenyl, 4,4'-diaminodiphenyl propane, 4,4'-diaminodiphenyl sulfide, 4,4'-oxydianiline, 4,4'-oxydiphthalic anhydride, 4,4-methylenedianiline (MDA), 4,4-oxydianiline (ODA), 4'-biphenyltetracarboxylic acid, 5-methyl-1,9-diaminononane, 9,9'-bis(4-amino)fluorine, acetic anhydride, benzenetrtracarboxylic dianhydride, benzidine, bicyclooct-7-ene-2,3,5,6-tetracarboxylic acid dianhydride (BODA), biphenyltetracarboxylic dianhydride, bis(2,3-dicarboxyphenyl) methane dianhydride, bis(3,4-dicarboxyphenyl) sulfone dianhydride, bis(aminopropyl) tetramethyldisiloxane, bisphenol A dianhydride, cyclobutane dianhydride, cyclobutanetetra-carboxylic acid dianhydride (CBDA), cyclohexane diamine, diethylenetriaminepentaacetic dianhydride (DTPA), dodecane diamine, hexamethylene diamine, mellitic acid dianhydride (MADA), meta-bis (aminophenoxydiphenyl)sulfone (m-BAPS), meta-phenylenediamine (m-PDA), naphthalenetetracarboxylic dianhydride, oxydibenzoic dianhydride, oxydiphthalic anhydride (ODPA), oxydiphthalic dianhydride, para-bis (aminophenoxydiphenyl)sulfone (p-BAPS), phthalic anhydride, pyridine, pyromellitic acid, pyromellitic dianhydride (PMDA), derivatives thereof, and combinations thereof.

The slurry of step (a) may further comprise a polymer matting agent or a coloring agent. Polymer matting agents may include nanoscaled inorganic particles, carbon black, finely ground polymer particles, and combinations thereof. Silica and surface-treated silica may be used as matting agents, optionally in combination with other matting agents. Reference is made to U.S. Pat. No. 8,574,720 (issued Nov. 5, 2013) for complete description of matting agents for polymer films, and methods of using said matting agents, applicable in the instant disclosure.

The slurry of step (a) may further comprise an additive selected from graphene, expanded graphite flakes, carbon nanotube, humic acid, carbon black, acetylene black, etc.

The solvent of mixing step (a) may comprise water, acetone, γ-butyrolactone, chlorobenzene, cyclopentyl methyl ether, dihydrolevoglucosenone (Cyrene) dimethylacetamide (DMAc), ethanol, N-methyl-2-pyrrolidone (NMP), hexafluorisopropanol (HFIP), butylated hydroxytoluene (BHT), dimethylformamide (DMF), dimethylsulfoxide (DMSO), methanol, methyl acetate, methyl ethyl ketone, methylene chloride, piperazine, sodium trifluoroacetate (NaTFA), tert-butanol, tetrahydrofuran (THF), 1,2,4-trichlorobenzene (TCB), triethylamine (TEA), triethyl phosphate, toluene, derivatives thereof, and mixtures thereof.

The solvent of mixing step (a) may comprise a solvent pair, including cyclohexanone-methanol, cyclohexanone-ethanol, cyclopentanone-methanol, cyclopentanone-ethanol, γ-butyrolactone-methanol, γ-butyrolactone-ethanol, γ-butyrolactone-water, γ-valerolactone-methanol, γ-valerolactone-ethanol, and γ-valerolactone-water, as taught in Duereh, Alif, et al. "Replacement of hazardous chemicals used in engineering plastics with safe and renewable hydrogen-bond donor and acceptor solvent-pair mixtures." ACS Sustainable Chemistry & Engineering 3.8 (2015): 1881-1889.

Film-forming (step (b)) can be conducted by casting or coating the slurry into a thin film on a solid substrate such as PET film. The film-forming process may optionally be carried out under the influence of an orientation-inducing stress field, for example by slot-die coating, reverse-roll coating, comma coating, or casting the slurry with a doctor blade to form a thin film of desired thickness. In a coating procedure, the shear stress may be created by extruding the dispensed slurry through a coating die over a supporting flexible PET substrate. The film may also be formed by spray coating, spin coating, or screen printing. The film may be formed by extruding the slurry into a bath of cure agents or conversion chemicals. The wet film may be from 1 μm to 200 μm in thickness prior to drying, or it may be thicker or thinner. The wet film may preferably be 10 μm, 20 μm, 50 μm or 70 μm in thickness.

Advantageously, the coating process can be a continuous, roll-to-roll process that is fully automated. The cast or coated film is initially in a wet state and the liquid component is substantially removed after coating or casting.

Step (b) of partially or completely removing the solvent liquid may be carried out by heat, ventilation, or by vacuum. This step may be carried out at a temperature from 25° C. to 300° C.

Step (c) of initiating a cure or conversion reaction may be carried out by exposure to chemicals, by exposure to heat, by exposure to radiation, by exposure to microwaves, by exposure to light, or by combinations thereof. Heat treatment to initiate a cure reaction may involve heating the film to a temperature from 100° to 500° C. for a period of time sufficient to effect crosslinking of the polymer precursor to the phthalocyanine compound (and graphene oxide, humic acid, etc. if present) to obtain a phthalocyanine compound-filled polymer film. The heat treatment time may be from 1 minute to 24 hours. The heat treatment time may be 5 minutes, 10 minutes, 1 hour, or may be longer or shorter. Higher heat treatment temperatures require shorter heat treatment times. Preferably, the heat treatment may be selected from 150° C. to 400° C. Preferably, the heat treatment may be carried out at 350° C. for 3 to 10 minutes. Heat treatment may be carried out in vacuum, in an inert gas atmosphere, or in standard atmospheric conditions. The finished film may be from 1 μm to 200 μm in thickness prior to drying, or it may be thicker or thinner. The finished film may preferably be 5 μm, 10 μm, 15 μm, 40 μm, 60 μm, 80 μm, or 100 μm in thickness.

For a polyimide film, the step of initiating a cure reaction may cause imidization of the slurry. The reaction may be allowed to progress to from 60% completion of imidization to 100% completion of imidization. Preferably, the reaction may be allowed to progress to about 80% completion, about 90% completion, or to about 95% completion.

The steps of coating and initiating a cure reaction may be repeated one or more times to create a thicker film. The composition of the slurry may be varied between coating steps to create a film having layers with varying properties.

Optionally, the phthalocyanine compound-filled polymer film may be stretched before, during or after initiation of the cure reaction.

Optionally, the phthalocyanine compound-filled polymer film may be compressed before, during or after the initiation of the cure reaction. The phthalocyanine compound-filled polymer film may be peeled from the substrate or may remain with the substrate.

The phthalocyanine compound-filled polymer films made from this process may have a tensile modulus from 3000 to 6000 MPa. The phthalocyanine compound-filled polymer film may have a dielectric strength from about 1,500 to about 7,000 V/mil. Preferably, the dielectric strength may be greater than 5000 V/mil. Preferably, the phthalocyanine compound-filled polymer film has a matte surface finish.

Optionally, phthalocyanine compound-filled films prepared by the disclosed process may be heat treated (carbonized) to increase the thermal or electrical conductivity. Reference is made to U.S. Patent Application No. 20150266739 (published Sep. 24, 2015) which is incorporated herein by reference, for complete description of methods for heat treating polymer films, applicable in the instant disclosure.

A similar process may be used to produce other types of filled polymers. For instance, a process for producing a phthalocyanine compound-filled polymer film may comprise the steps of: (a) mixing a phthalocyanine compound with a polymer precursor material and a liquid to form a slurry or suspension; (b) forming the slurry or suspension into a wet film; (c) partially or completely removing the liquid from the wet film to form a precursor polymer composite film; and (d) initiating a cure reaction of the film to obtain a phthalocyanine compound-filled composite film. The polymer is preferably selected from the group consisting of polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, and combinations thereof.

The following examples are presented to illustrate the best modes of practicing the instant disclosure, and not to be construed as limiting the scope of the instant disclosure:

Example 1: Preparation of Polybenzoxazole (PBO) Films and Phthalocyanine Compound-PBO Composite Films Polybenzoxazole (PBO) films were prepared via casting and thermal conversion from its precursor, methoxy-containing polyaramide (MeO-PA). Specifically, monomers of 4,4'-diamino-3,3'-dimethoxydiphenyl (DMOBPA), and isophthaloyl dichloride (IPC) were selected to synthesize PBO precursors, methoxy-containing polyaramide (MeO-PA) solution. This MeO-PA solution for casting was prepared by polycondensation of DMOBPA and IPC in DMAc solution in the presence of pyridine and LiCl at −5° C. for 2 hr, yielding a 20 wt % pale yellow transparent MeO-PA solution. The inherent viscosity of the resultant MeO-PA solution was 1.20 dL/g measured at a concentration of 0.50 g/dl at 25° C. This MeO-PA solution was diluted to a concentration of 15 wt % by DMAc for casting.

Figure 2:
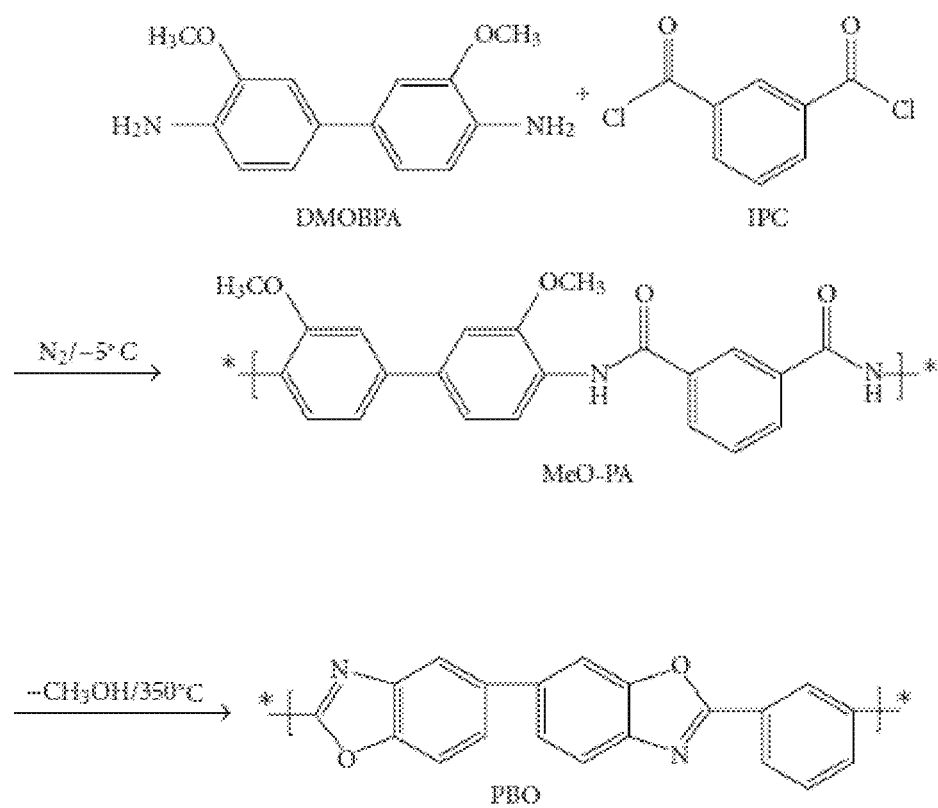
FIG. 2 Chemical reactions associated with production of PBO.

The as-synthesized MeO-PA was cast onto a glass surface to form thin films (35-120 μm) under a shearing condition. The cast film was dried in a vacuum oven at 100° C. for 4 hr to remove the residual solvent. Then, the resulting film with a thickness of approximately 28-100 μm was treated at 200° C.-350° C. under $N_2$ atmosphere in three steps and annealed for about 2 hr at each step. This heat treatment serves to thermally convert MeO-PA into PBO films. The chemical reactions involved may be illustrated in FIG. 2. In some samples, from 1% to 50% (1%, 5%, 10%, 15%, 20%, 25%, 30%, 35%, 40%, 45%, 50% by weight) of a copper phthalocyanine or zinc phthalocyanine were added into MeO-PA solution prior to casting. For comparison, some samples contain graphene oxide or expanded graphite (EP) platelets. The filled PBO films were made under similar conditions. The graphene oxide or EP flake proportions were varied from 1% to 15% by weight.

Figure 3:
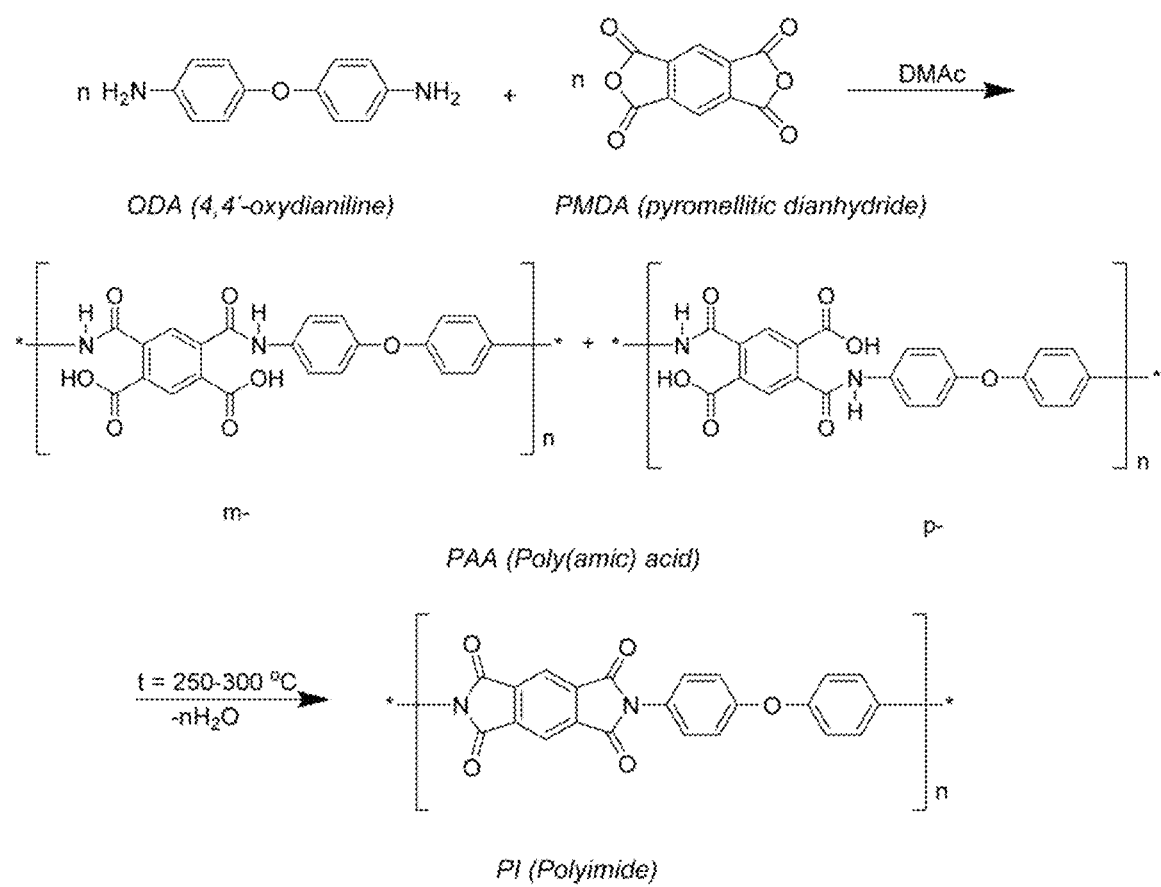
FIG. 3 Chemical reactions associated with production of polyimide (PI).

Example 2: Preparation of Polyimide (PI) Films and Phthalocyanine Compound-Filled Polyimide Films The synthesis of conventional polyimide (PI) involved poly(amic acid) (PAA, Sigma Aldrich) formed from pyromellitic dianhydride (PMDA) and oxydianiline (ODA). Prior to use, both chemicals were dried in a vacuum oven at room temperature. Next, 4 g of the monomer ODA was dissolved into 21 g of DMF solution (99.8 wt %). This solution was stored at 5° C. before use. Various amounts (2-35% by weight) of nitrogen phthalocyanine and Co phthalocyanine, respectively suspended/dissolved in DMAC, were added, and the slurry was stirred for 4 hours using a magnetic stir bar. Subsequently, the viscous polymer solution was cast onto a polymer film or glass substrate and heat treated to create an opaque, flexible black film having a thickness that was varied from 1.1 to about 92 μm. Representative chemical reactions involved in the formation of polyimide polymers from precursors (monomers or oligomers) are given in FIG. 3.

Example 3: Preparation of Polybenzimidazole (PBI) Films and Phthalocyanine Compound-PBI Films PBI is prepared by step-growth polymerization from 3,3',4,4'-tetraaminobiphenyl and diphenyl isophthalate (an ester of isophthalic acid and phenol). The PBI used in the present study was in a PBI solution form, which contains 0.7 dl/g PBI polymer dissolved in dimethylacetamide (DMAc). The PBI and phthalocyanine compound-PBI films were cast onto the surface of a glass substrate. The iron phthalocyanine was used in this study.

Scanning electron microscopy (SEM), transmission electron microscopy (TEM) pictures of lattice imaging of the graphene layer, as well as selected-area electron diffraction (SAD), bright field (BF), and dark-field (DF) images were also conducted to characterize the structure of various graphitic film materials. A close SEM scrutiny of the PBI-polymer composite films indicates that the films were very uniform and phthalocyanine compound molecules are not easily discernable.

Example 4: Preparation of Various Polymer Protected Phthalocyanine Compounds Emulsion polymerization was found to provide simple and direct route for the preparation phthalocyanine compound-polymer films. In a typical process, a phthalocyanine compound was first dispersed in an aqueous solution containing a statistical oligomer constituted of five butyl acrylate and ten acrylic acid units prepared by reversible addition fragmentation chain transfer (RAFT) polymerization using a trithiocarbonate as RAFT agent. Then, emulsion polymerization was initiated and cast into films, leading to the formation of thin polymer composite films.

Example 5: Polymer Composite Films Containing a Phthalocyanine Compound and Some Humic Acid or Reduced Humic Acid from Leonardite Humic acid can be extracted from leonardite by dispersing leonardite in a basic aqueous solution (pH of 10) with a high yield (in the range from 75%). Subsequent acidification of the solution leads to precipitation of humic acid powder. In an experiment, 3 g of leonardite was dissolved by 300 ml of double deionized water containing 1 M KOH (or $NH_4OH$) solution under magnetic stirring. The pH value was adjusted to 10. The solution was then filtered to remove any big particles or any residual impurities.

A humic acid dispersion, containing a FePc compound (15% by wt.), HA (10% by wt.) and a polymer precursor material uncured polyamic acid and monomers for phenolic resin, respectively), was dissolved in a common solvent and was cast onto a glass substrate to form a series of precursor composite films. The films were then thermally converted or cured into PI composite and phenolic resin composite films, respectively.

Example 6: Measurements of the Tensile Strength, Dielectric Strength, and Gloss of Various Polymer Composite Films A universal testing machine was used to determine the tensile strength and modulus of these materials (ASTM D-882). The dielectric strength of the polymer films was measured according to ASTM D-149. The 60-degree gloss value was measured using Micro-TRI-Gloss meter. These procedures are well-known in the art. The tensile strength of the polymer composite films is found to be from 210 MPa to 330 MPa. The dielectric strength is from 1500 to 7800 V/mil. The 60-degree gloss value is from 2 to 35 for samples containing a matting agent.

The invention claimed is:

1. A process for producing a phthalocyanine compound-filled polyimide film comprising the steps of:
    a) Mixing a phthalocyanine compound with a polyimide precursor material and a liquid to form a slurry or solution, wherein said slurry or suspension further comprises a cure agent or anhydride selected from the group consisting of benzenetetracarboxylic dianhydride, biphenyltetracarboxylic dianhydride, diethylenetriaminepentaacetic dianhydride (DTPA), ethylenediaminetetraacetic dianhydride (EDTA), mellitic acid dianhydride (MADA), naphthalenetetracarboxylic dianhydride, oxydibenzoic dianhydride, oxydiphthalic anhydride (ODPA), phthalic anhydride, and combinations thereof;
    b) forming a wet film from said slurry or solution;
    c) partially or completely removing said liquid from said wet film to form a precursor polyimide composite film; and
    d) imidizing said precursor polyimide composite film to 90% or more completion of the crosslinking reaction, to obtain said phthalocyanine compound-filled composite film.

2. The process of claim 1, wherein said step of forming said slurry or solution into a wet film is carried out by a doctor blade-assisted casting, slot die coating, comma coating, reverse-roller coating, spray coating, spin coating, or screen printing and said step is conducted optionally under the influence of an orientation-inducing stress field to align molecules of said phthalocyanine compound on a solid substrate.

3. A process for producing a phthalocyanine compound-filled polyimide film comprising the steps of:
    a) Mixing a phthalocyanine compound with a polyimide precursor material and a liquid to form a slurry or solution;
    b) forming a wet film from said slurry or solution;
    c) partially or completely removing said liquid from said wet film to form a precursor polyimide composite film, wherein said step of partially or completely removing said liquid from said wet film is carried out in vacuum, in an inert atmosphere, in a ventilation environment, or at a temperature from 25° C. to 300° C.; and
    d) imidizing said precursor polyimide composite film to 90% or more completion of the crosslinking reaction, to obtain said phthalocyanine compound-filled composite film.

4. A process for producing a phthalocyanine compound-filled polyimide film comprising the steps of:
    a) Mixing a phthalocyanine compound with a polyimide precursor material and a liquid to form a slurry or solution;
    b) forming a wet film from said slurry or solution;
    c) partially or completely removing said liquid from said wet film to form a precursor polyimide composite film; and
    d) imidizing said precursor polyimide composite film to 90% or more completion of the crosslinking reaction, to obtain said phthalocyanine compound-filled composite film, wherein said imidizing step is carried out by exposure to a temperature from 100° C. to 500° C. for a period of time sufficient to effect crosslinking of said polymer and chemical bonding of said polymer to molecules of said phthalocyanine compound, by exposure to light, by exposure to microwave energy, by exposure to radiation, or by combinations thereof.

5. The process of claim 4, wherein said period of time is from 1 minute to 4 hours.

6. The process of claim 1, further comprising a step of compressing or stretching said phthalocyanine compound-filled polyimide film during or after said step (d) of imidizing said phthalocyanine compound-filled polyimide film.

7. The process of claim 1, further comprising a step of adding one or more additional layers of phthalocyanine compound-filled polymer film after completing a first layer of phthalocyanine compound-filled composite film, where said one or more additional layers have the same chemical composition as said first layer or have a different chemical composition.

8. The process of claim 1, further comprising a step of adding one or more additional layers of precursor composite film after completing a first layer of precursor composite film, where said one or more additional layers have the same chemical composition as said first layer, or have a different chemical composition.

9. The process of claim 1, wherein said polyimide precursor material is selected from aromatic diamines, aliphatic diamines, or a mixtures thereof in combination with aromatic dianhydrides.

10. The process of claim 1, wherein said slurry further comprises a monomer, an oligomer, a polymer, a photosensitizer, or a combination thereof.

11. The process of claim 1, wherein said liquid comprises water, acetone, γ-butyrolactone, chlorobenzene, cyclopentyl methyl ether, dihydrolevoglucosenone, dimethylacetamide (DMAc), ethanol, N-methyl-2-pyrrolidone (NMP), hexafluorisopropanol (HFIP), butylated hydroxytoluene (BHT), dimethylformamide (DMF), dimethylsulfoxide (DMSO), methanol, methyl acetate, methyl ethyl ketone, methylene chloride, piperazine, sodium trifluoroacetate (NaTFA), tert-butanol, tetrahydrofuran (THF), 1,2,4-trichlorobenzene (TCB), triethylamine (TEA), triethyl phosphate, toluene, a derivatives thereof, or a mixtures thereof.

12. The process of claim 1, wherein said slurry or suspension further comprises an additive selected from a matting agent, a colorant, a reinforcement or a combination thereof wherein said additive is at a total additive weight of 0.1 weight percent to 15 weight percent of the total weight of the dried film.

* * * * *